(12) United States Patent
Choi et al.

(10) Patent No.: US 9,838,573 B2
(45) Date of Patent: Dec. 5, 2017

(54) METHOD FOR GUIDING CONTROLLER TO MOVE TO WITHIN RECOGNIZABLE RANGE OF MULTIMEDIA APPARATUS, THE MULTIMEDIA APPARATUS, AND TARGET TRACKING APPARATUS THEREOF

(71) Applicant: Samsung Electronics Co., Ltd., Gyeonggi-do (KR)

(72) Inventors: Jin-Wuk Choi, Seoul (KR); Dong-Wook Kwon, Gyeonggi-do (KR); Jung-Seop Kim, Seoul (KR); Kyung-Il Kim, Gyeonggi-do (KR); Min-Ho Kim, Gyeonggi-do (KR); Gi-Sang Lee, Gyeonggi-do (KR); Sang-Bo Lee, Gyeonggi-do (KR); Jin-Kyung Lee, Gyeonggi-do (KR); Sun-Tae Jung, Gyeonggi-do (KR); Young-Gu Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 453 days.

(21) Appl. No.: 14/030,340

(22) Filed: Sep. 18, 2013

(65) Prior Publication Data
US 2014/0078311 A1 Mar. 20, 2014

(30) Foreign Application Priority Data

Sep. 18, 2012 (KR) .................... 10-2012-0103507
Feb. 15, 2013 (KR) .................... 10-2013-0016574

(51) Int. Cl.
*H04N 5/222* (2006.01)
*G06F 3/0346* (2013.01)
(Continued)

(52) U.S. Cl.
CPC ......... *H04N 5/2228* (2013.01); *G06F 3/0346* (2013.01); *H04N 21/4126* (2013.01);
(Continued)

(58) Field of Classification Search
CPC .. G09B 19/00; H04N 5/2228; H04N 5/23219; G06F 3/0346; G06F 3/00;
(Continued)

(56) References Cited

U.S. PATENT DOCUMENTS 6,295,064 B1 * 9/2001 Yamaguchi ............. G06T 15/20
345/419
8,409,003 B2 * 4/2013 Ikeda ...................... A63F 13/06
463/36

(Continued)

FOREIGN PATENT DOCUMENTS

| CN | 1849613 | 10/2006 |
| CN | 101267501 | 9/2008 |
| CN | 102639199 | 8/2012 |

OTHER PUBLICATIONS

Gil, Lory, Sally Park Lets You Forget Where You Parked Without Losing Your Car, Aug. 27, 2012, http://appadvice.com/appnn/2012/08/quickadvice-sallypark, p. 1.*

(Continued)

*Primary Examiner* — Jayanti K Patel
*Assistant Examiner* — Marnie Matt
(74) *Attorney, Agent, or Firm* — The Farrell Law Firm, P.C.

(57) ABSTRACT

Methods, systems, and devices for guiding a subject back within the recognizable visual range of a multimedia system are described. According to one of the described methods, when it is determined that the target has left the recognizable range of the multimedia system, sensor information is acquired from a portable electronic device (or controller) the user has been using to control the multimedia system, and the acquired sensor information is used to determine where the user is, relative to the recognizable range. In one example, the user is asked to make a gesture with the portable electronic device, and the sensor information con- (Continued)

cerning that gesture is used to determine the user's relative location. In another example, the sensor information recorded at the time the user left the recognizable range is used to determine the user's relative location.

23 Claims, 8 Drawing Sheets

(51) Int. Cl.
H04N 21/41 (2011.01)
H04N 21/4223 (2011.01)
H04N 21/442 (2011.01)
A63F 13/213 (2014.01)

(52) U.S. Cl.
CPC ... *H04N 21/4223* (2013.01); *H04N 21/44231* (2013.01); *A63F 13/213* (2014.09)

(58) Field of Classification Search
CPC .... G06F 3/017; G06F 3/0304; G06F 3/04812; G06F 3/011; A63F 2300/6684; A63F 2300/1087
USPC .......................................................... 348/169
See application file for complete search history.

(56) References Cited

U.S. PATENT DOCUMENTS

| | | | | |
|---|---|---|---|---|
| 8,504,008 B1* | 8/2013 | Gossweiler, III | H04M 1/72533 | 455/419 |
| 2001/0042245 A1* | 11/2001 | Iwamura | G08C 23/00 | 725/1 |
| 2002/0175897 A1* | 11/2002 | Pelosi | G01S 3/784 | 345/158 |
| 2002/0193150 A1* | 12/2002 | Pritchard | H04M 1/72572 | 455/567 |
| 2005/0068227 A1* | 3/2005 | Caspi | H04W 64/00 | 342/357.35 |
| 2005/0200478 A1* | 9/2005 | Koch | G06Q 10/08 | 340/539.13 |
| 2007/0008124 A1* | 1/2007 | Stadler | E05F 15/73 | 340/545.1 |
| 2007/0060385 A1* | 3/2007 | Dohta | A63F 13/06 | 463/43 |
| 2007/0115254 A1* | 5/2007 | Wu | G06F 3/03542 | 345/156 |
| 2007/0116364 A1* | 5/2007 | Kleihorst | G06K 9/00221 | 382/190 |
| 2007/0213127 A1* | 9/2007 | Sato | A63F 13/06 | 463/36 |
| 2007/0268392 A1* | 11/2007 | Paalasmaa | G01C 21/20 | 348/333.02 |
| 2008/0225137 A1* | 9/2008 | Kubo | H04N 5/23203 | 348/231.2 |
| 2009/0305207 A1* | 12/2009 | Ueshima | A63B 24/0003 | 434/258 |
| 2010/0007518 A1* | 1/2010 | Kang | G06F 3/017 | 340/12.22 |
| 2010/0053322 A1* | 3/2010 | Marti | G06F 3/011 | 348/135 |
| 2010/0117960 A1* | 5/2010 | Huntzicker | G06F 1/1626 | 345/158 |
| 2010/0151948 A1* | 6/2010 | Vance | A63F 13/06 | 463/43 |
| 2010/0174421 A1* | 7/2010 | Tsai | G06F 1/1616 | 700/302 |
| 2010/0188397 A1* | 7/2010 | Tsai | G06F 1/1626 | 345/419 |
| 2010/0188503 A1* | 7/2010 | Tsai | G01C 21/20 | 348/142 |
| 2011/0081969 A1* | 4/2011 | Ikeda | A63F 13/24 | 463/37 |
| 2011/0118032 A1 | 5/2011 | Zalewski | | |
| 2011/0137895 A1* | 6/2011 | Petrou | G06F 17/30241 | 707/723 |
| 2011/0169734 A1* | 7/2011 | Cho | G06F 3/0346 | 345/157 |
| 2011/0175995 A1* | 7/2011 | Doerrer | G06K 9/00134 | 348/79 |
| 2011/0312311 A1* | 12/2011 | Abifaker | G06F 3/017 | 455/418 |
| 2012/0026166 A1* | 2/2012 | Takeda | A63F 13/06 | 345/419 |
| 2012/0079018 A1* | 3/2012 | Rottler | H04M 1/72572 | 709/204 |
| 2012/0198353 A1* | 8/2012 | Lee | G06F 3/017 | 715/748 |
| 2012/0229512 A1* | 9/2012 | Hayashi | A63F 13/214 | 345/649 |
| 2012/0232780 A1* | 9/2012 | Delson | A63F 13/06 | 701/400 |
| 2012/0308140 A1* | 12/2012 | Ambrus | G06K 9/00362 | 382/190 |
| 2014/0213301 A1* | 7/2014 | Evans | H04W 4/023 | 455/456.3 |
| 2014/0232569 A1* | 8/2014 | Skinder | G01C 21/16 | 340/989 |

OTHER PUBLICATIONS

Gil, Sally Park Lets You Forget Where You Parked Without Losing your Car, Aug. 27, 2012 (http://appadvice.com/appnn/2012/08/quickadvice-sallypark).*
Gil, Sally Park Lets You Forget Where You Parked Without Losing your Car, Aug. 27, 2012, (http://appadvice.com/appnn/2012/08/quickadvice-sallypark).*
European Search Report dated Feb. 14, 2017 issued in counterpart application No. 13184907.7-1972, 8 pages.
Chinese Office Action dated Aug. 3, 2017 issued in counterpart application No. 201310426326.6, 24 pages.

* cited by examiner

METHOD FOR GUIDING CONTROLLER TO MOVE TO WITHIN RECOGNIZABLE RANGE OF MULTIMEDIA APPARATUS, THE MULTIMEDIA APPARATUS, AND TARGET TRACKING APPARATUS THEREOF

PRIORITY

This application claims priority under 35 U.S.C. §119(a) to a Korean patent application filed in the Korean Intellectual Property Office on Sep. 18, 2012 and assigned Serial No. 10-2012-0103507 and to a Korean patent application filed in the Korean Intellectual Property Office on Feb. 15, 2013 and assigned Serial No. 10-2013-0016574, the entire disclosures of both of which are incorporated herein by reference.

BACKGROUND OF THE INVENTION

1. Field of the Invention

The present invention relates generally to guiding a user of a multimedia apparatus back within the recognizable range of the multimedia apparatus, and more specifically, to estimating the location of a controller of the multimedia apparatus to be located within the operating environment of the multimedia apparatus.

2. Description of the Related Art Along with the rapid development of communication technologies, the functions of electronic devices rapidly expand, which requires the continuing and rapid development of various User Interfaces (UIs) enabling these growing and varied functions. Electronic devices provide a variety of input methods and means for controlling these various functions.

In general, a user uses key inputs to control the functions of an electronic device. When the electronic device has a touch screen, the user touches specific regions on the touch screen to control the device. In general, electronic devices are controlled according to direct inputs through a specific input unit.

Besides direct input, vision-based recognition methods can be used to control electronic systems. Vision-based recognition methods extract image information from one or more images taken by a visual input device, and the extracted image information is used to supply input to the electronic system. In the example of a vision-based recognition method shown in FIG. 1, the user's movement is photographed with a camera 110 mounted on a display apparatus 100, such as a TV, and the screen of the display apparatus 100 changes according to the user's movement. The user must be positioned within angle-of-view range 120 of the camera 110 for the display apparatus 100 to recognize the user's movement; when the user is positioned outside the angle-of-view range of the camera 110, the display apparatus 100 can not recognize the user's movement.

However, the user can not tell if he or she is inside or outside the angle-of-view range, and, even when informed, the user may not know how and where to move to get back within the angle-of-view range of the system.

Thus, a method and apparatus for guiding a target subject (i.e., the user) back within the angle-of-view range when the user moves outside the angle-of-view range is needed.

SUMMARY OF THE INVENTION

The present invention has been made to address at least the above-mentioned problems and/or disadvantages and to provide at least the advantages described below. Accordingly, an aspect of the present invention is to provide an apparatus and method for guiding a target subject to move within an imaging region of a multimedia apparatus.

Another aspect of the present invention is to provide an apparatus and method for tracking the movement of a controller of a multimedia apparatus in the operating environment of the multimedia apparatus in order to guide the user of the controller when he or she moves outside the recognizable viewing range of the multimedia apparatus.

In accordance with an aspect of the present invention, a method for guiding a user of a controller of a multimedia apparatus to move back within the recognizable range of a camera connected to the multimedia apparatus is provided, including determining whether a target is within the recognizable range of the camera; and, if it is determined that the target is not within the recognizable range, acquiring sensor information indicating movements of the controller; estimating the location of the controller based on the sensor information of the controller's movements; and outputting guidance information corresponding to the estimated location of the controller to guide the target to move within the recognizable range of the camera.

In accordance with another aspect of the present invention, a multimedia apparatus for guiding a user of a controller of the multimedia apparatus to move within a recognizable range of a camera connected to the multimedia apparatus is provided, including an image processor configured to recognize a target from an image acquired by the camera within the recognizable range of the camera; a control unit configured to acquire sensor information of the controller's movements when no target is detected within recognizable range of the camera, to estimate the location of the controller using the sensor information of the controller, and to output guidance information corresponding to the estimated location of the controller to guide the target to move within the recognizable range of the camera; and a display unit configured to display guidance information corresponding to the estimated location of the controller. In accordance with yet another aspect of the present invention, a portable electronic device is provided, including a short-range communication unit configured to transmit short-range communication signals; at least one sensor configured to acquire information concerning at least one of orientation, movement, and location of the portable electronic device; and at least one non-transitory computer-readable medium having program instructions recorded thereon, the program instructions configured to have the portable electronic device perform the steps of receiving, via the short-range communication unit, a request from a multimedia system for sensor information when a user of the portable electronic device is outside a recognizable range of the multimedia system; and transmitting, via the short-range communication unit, the requested sensor information to the multimedia system, the multimedia system subsequently using the received sensor information to determine which direction outside its recognizable visual range the user is in.

In accordance with still another aspect of the present invention, a multimedia system is provided, including a display; a short-range communication unit configured to transmit short-range communication signals; at least one visual input device configured to acquire at least one of movement and position information of a user of a portable electronic device within a recognizable visual range in front of the display; and at least one non-transitory computer-readable medium having program instructions recorded thereon, the program instructions configured to have the multimedia system perform the steps of detecting when the user is outside the recognizable visual range of the at least one visual input device; and when it is detected that the user is outside the recognizable visual range, requesting the user to perform an action with the portable electronic device, receiving, via the short-range communication unit, sensor information concerning the requested action from the portable electronic device, and using the received sensor information to determine which direction outside the recognizable visual range the user is in.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

Figure 1:
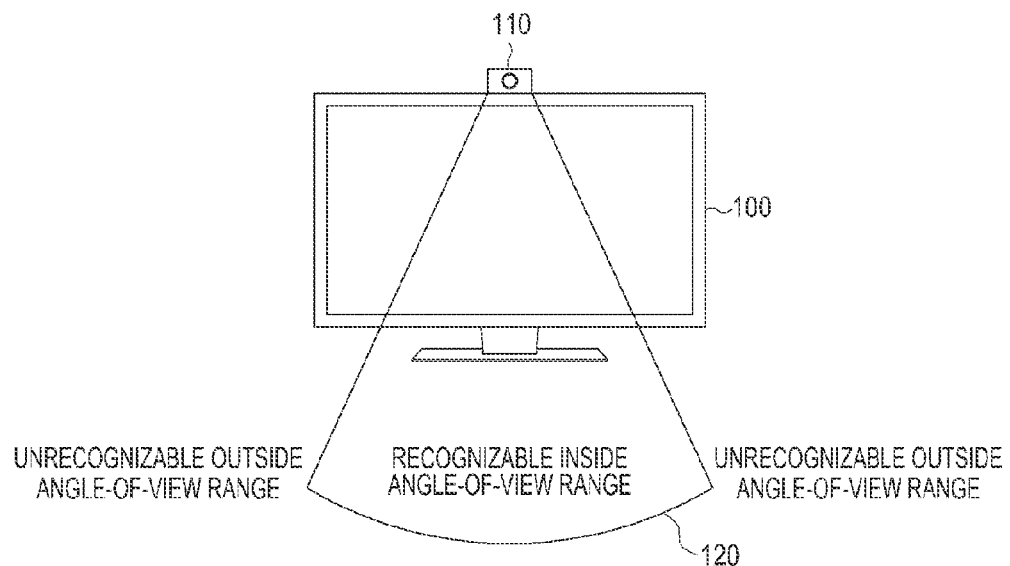
FIG. 1 illustrates a recognizable range of a general multimedia apparatus.

Hereinafter, embodiments of the present invention will be described in detail with reference to the appended drawings. However, it should be apparent to those skilled in the art that the following description of the embodiments of the present invention is provided for illustration purpose only and not for the purpose of limiting the invention as defined by the appended claims and their equivalents. In the following description, for easy understanding, like numbers refer to like elements throughout the description of the figures, and the same elements will not be described further.

It will be understood that, although the terms first, second, etc. may be used herein to describe various elements, these elements are not limited by these terms, which are only used to help distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise.

Embodiments of the present invention provide a method and apparatus for guiding a target subject (i.e., user) back within the recognizable viewing range of a multimedia apparatus. The method includes when no target is detected in the recognizable range of the multimedia apparatus, acquiring acceleration information from the user's controller to determine where the controller is located outside the recognizable range of the multimedia apparatus; and outputting guidance information to guide the user back within the recognizable range of the multimedia apparatus.

As used herein, the "recognizable range" is the field of view of the camera included in a target tracking unit of a multimedia apparatus. In other words, the recognizable range is what can be seen when viewing a subject through the lens of the camera. The recognizable range depends on the angle of view of the camera, which is a unique property of the camera.

If the target subject or user (the terms "target subject," "target," "subject," and "user" are used interchangeably for the same entity, or parts of that entity, depending on the context) is outside the recognizable range of the multimedia apparatus, the multimedia apparatus cannot track the movement of the target. Furthermore, in the case of a fast-moving subject, such as a hand or foot, it is difficult to track the location to which the subject has moved only using image sensors. Accordingly, it is necessary to accurately estimate the location of the target and use that location information to guide the target to move within the recognizable range. To do this, a method according to one embodiment of the present invention uses the controller to input and control commands to the multimedia apparatus, to estimate the location of the target possessing the controller, and then to guide the target to move within the recognizable range of the multimedia apparatus.

Figure 2:
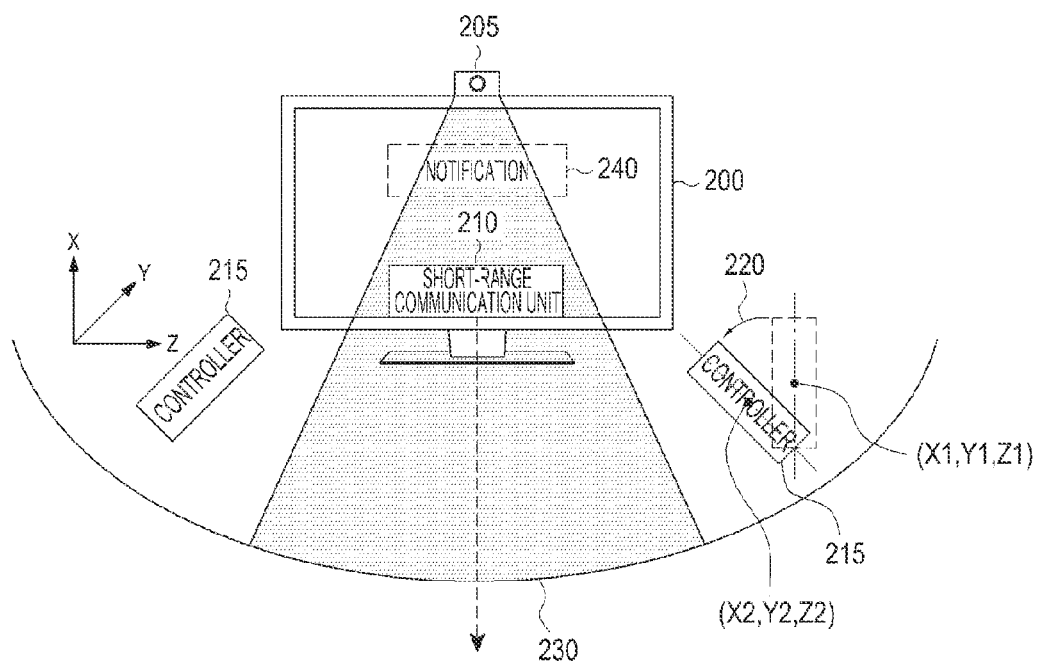
FIG. 2 illustrates an embodiment of the present invention in which a controller of a multimedia apparatus is located outside the recognizable viewing range of the multimedia apparatus.

FIG. 2 illustrates determining the orientation and/or position of a controller 215 when it has moved outside the recognizable range of multimedia apparatus 200. In FIG. 2, the multimedia apparatus 200 is a TV, however, the multimedia apparatus 200 can be any apparatus capable of tracking a user's movement and using the tracked movement as an input command, such as a TV, a desktop PC, a tablet PC, a game, and the like. The controller 215 illustrated in FIG. 2 is used as an input unit for controlling applications, games, etc. that are executed by the multimedia apparatus 200. For example, when a user is playing a tennis video game on the multimedia apparatus 200, the user may physically manipulate the controller 215 like a tennis racket. In this example, the tennis player's positions and gestures in regards to the tennis racket 10 as shown on the display of the multimedia apparatus 200 change according to the user's positions and gestures, as tracked by the controller 215.

Referring to FIG. 2, the multimedia apparatus 200 tracks a user, and outputs an image using the user's movement as an input command. To do this, a target tracking unit 205 for photographing and tracking the user is mounted on the upper part of the multimedia apparatus 200. The location of the target tracking unit 205 can be any location from which the user's whole body and movement can be easily sensed. In this embodiment, the target tracking unit 205 has recognizable range 230.

The multimedia apparatus 200 connects to external devices through an external device connector, for example, a short-range communication unit 210. Here, the external device connector can be any type of short-range communication unit, such as a Bluetooth communication unit, a Near Field Communication (NFC) unit, or any system, device, or component capable of connecting the multimedia apparatus 200 in a wireless manner through short-range communication, including, a WiFi Direct communication unit. In this embodiment, the controller is an external device that uses the short-range communication unit to communicate with multimedia apparatus 200, and may be a mobile terminal, such as a remote controller, a sensor band, a mobile phone, a smart phone, a tablet PC, and the like. In this embodiment, the multimedia apparatus 200 can communicate within a radius of 10 m using the short-range communication unit 210.

A recognition algorithm is applied to images received through the target tracking unit 205 in order to detect and track the user. Through these means, the multimedia apparatus 200 can determine when the user has moved out of the recognizable range 230. When this occurs, the multimedia apparatus 200 according to an embodiment of the present invention accurately estimates the location of the user using the controller 215 possessed by the user. More specifically, the multimedia apparatus 200 acquires sensor information from the controller 215 through the short-range communication unit 210, and then uses that sensor information for location and/or orientation estimation.

The sensor information from controller 215 includes x-, y-, and z-axis coordinate values. In order to determine whether controller 215 is located on the left or the right side outside the recognizable range 230, the multimedia apparatus 200 outputs a notification message 240 to acquire more accurate coordinate values of the controller 215. For example, when a user has moved out of the recognizable range 230, the multimedia apparatus 200 may show the user's absence on the screen, and display a notification message for the user to move the controller 215 to face the screen. When the user sees the notification message, the user will rotate the controller 215 to face the multimedia apparatus 200. If the controller 215 is located to the right outside the recognizable range 230 with respect to the center of the multimedia apparatus 200, the controller 215 will be rotated in the left direction 220. If the controller 215 is located to the left with respect to the center of the multimedia apparatus 200, the controller 215 will be rotated in the right direction.

Before, during, and after the user makes a gesture to move the controller 215 to face the multimedia apparatus 200, controller 215 is acquiring sensor information. More specifically, the controller 215 acquires sensor information about its initial coordinates (X1, Y1, Z1) before the user makes the gesture, and its coordinates (X2, Y2, Z2) after the user makes the gesture. That sensor information, which indicates the change in the controller's orientation before and after the gesture, is transmitted to the multimedia apparatus 200 so that the multimedia apparatus 200 can accurately recognize where the controller 215 is located outside the recognizable range 230. Multimedia apparatus 200 subsequently outputs user guidance information, based on the determined location of the controller 215, through at least one of the screen, a speaker, and a vibration device. The guidance information guides the user to move in the direction opposite to the direction outside recognizable range 205 the controller 215 has moved.

Figure 3:
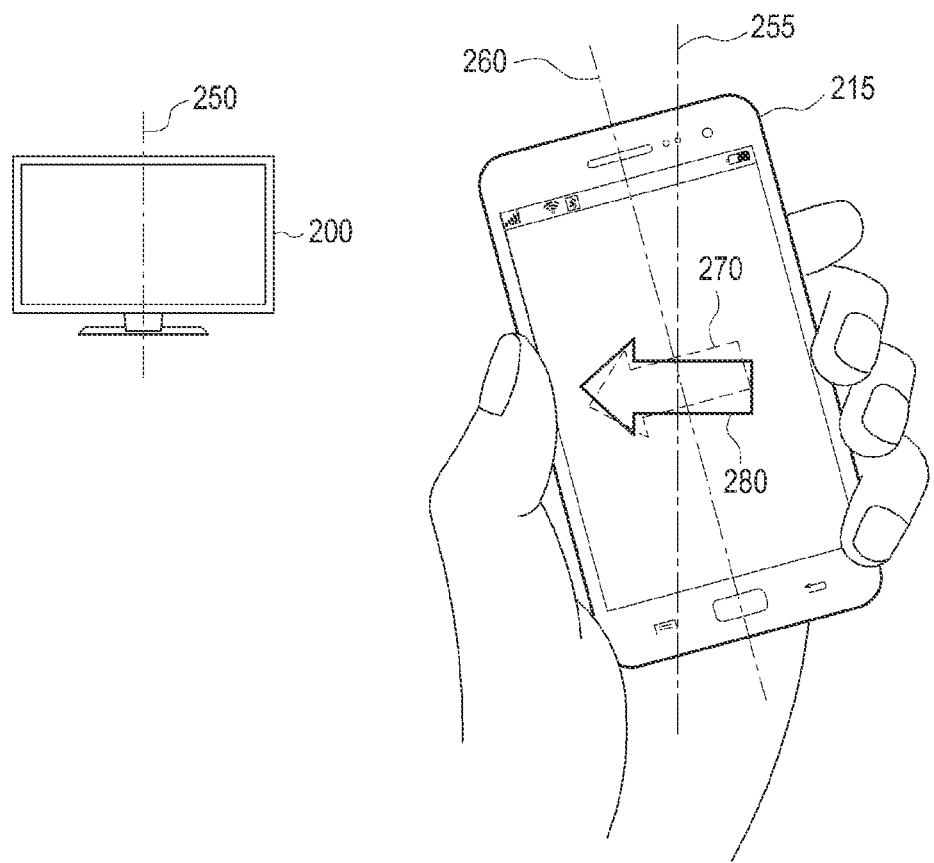
FIG. 3 illustrates guidance information displayed on the screen of a controller according to an embodiment of the present invention.

According to another embodiment of the present invention, as illustrated in FIG. 3, guidance information is displayed on the screen of the controller 215, instead of on the screen of the multimedia apparatus 200. When the multimedia apparatus 200 acquires sensor information from the controller 215, the multimedia apparatus 200 calculates the tilt angle that the reference axis 260 of the controller 215 makes with respect to a multimedia apparatus reference axis 255, which corresponds to a predetermined reference axis 250 of the multimedia apparatus 200, determines the relative location and/or orientation of controller 215 based on that tilt angle, and then transmits guidance information to the controller 215. That is, the multimedia apparatus 200 generates information about the guidance direction that is to be displayed on the controller 215, and provides that information to the controller 215, which may show, e.g., an arrow on its screen to indicate where the user and/or controller should move. Furthermore, as illustrated in FIG. 3, the direction of the arrow 270 displayed on the screen of the controller 215 changes with the tilting angle of the controller 215. In the example of FIG. 3, the controller 215 changes display arrow 270 to display arrow 280, based on the change in orientation and/or location determined using, e.g., a compass sensor, etc.

According to embodiments of the present invention, the screen of the controller 215 may show information about the distance between the controller 215 and the multimedia apparatus 200, and/or information about in which direction the multimedia apparatus 200 is relative to controller 215. In FIG. 3, like a compass, the direction in which the user possessing the controller 215 has to move (determined based on the tilting angle of the controller 215) is displayed on the screen of the controller 215. FIG. 3 is only one example. The screen of the controller may also display the relative distance between the multimedia apparatus 200 and the controller 215, or the distance the user has to move to get back into recognizable range.

In FIG. 3, guidance information is output through a screen, however, guidance information may be output through a speaker or a vibration device. For example, when using a vibration device, the controller 215 may output a vibration signal corresponding to direction information received from the multimedia apparatus 200 while moving from left to right or vice versa, thereby notifying the user of the direction in which he/she has to move.

Figure 4A:
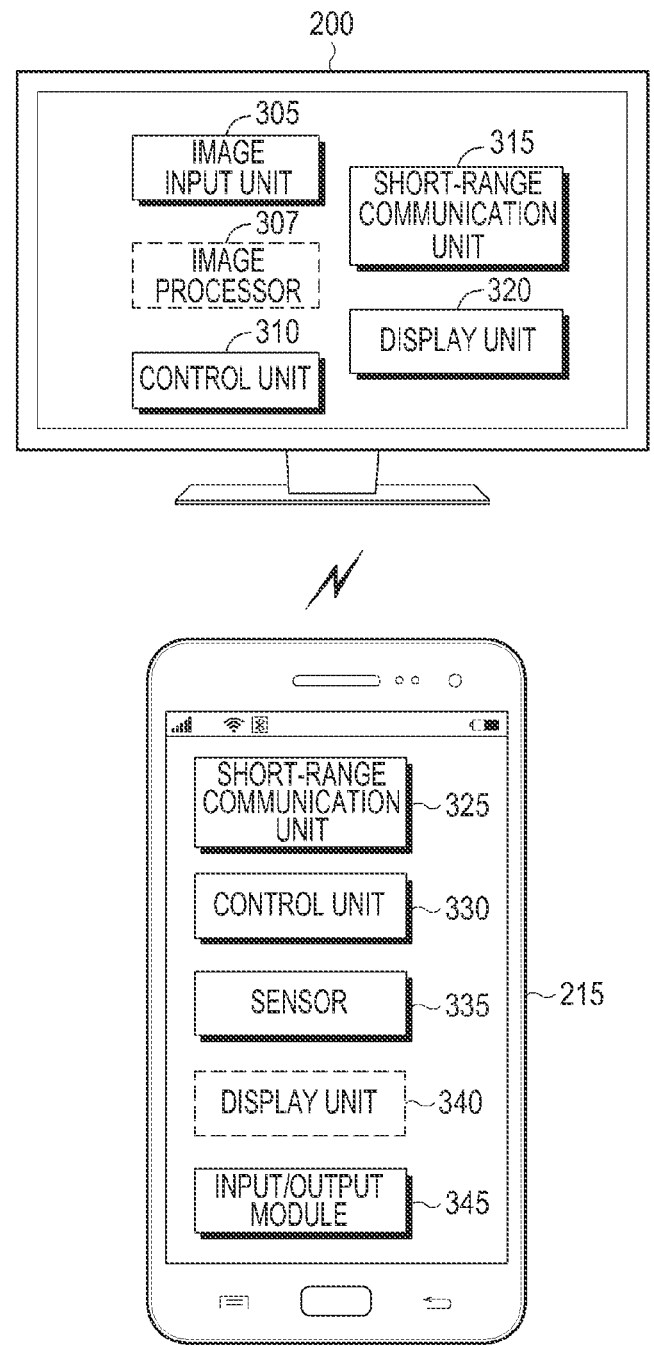
FIG. 4A is a block diagram of the multimedia apparatus and the controller according to an embodiment of the present invention.

Hereinafter, the detailed operations and configurations of the multimedia apparatus 200 and the controller 215 will be described with reference to FIG. 4A. FIG. 4A illustrates only components related to the embodiments of the present invention, and detailed descriptions about the other well-known components constituting the multimedia apparatus 200 and the controller 215 will be omitted since they are not directly pertinent to the present invention.

Referring to FIG. 4A, the multimedia apparatus 200 includes an image input unit 305, a control unit 310, a short-range communication unit 315 for communicating with the controller 215, and a display unit 320 for displaying guidance information. The image input unit 305 photographs still images or moving images under the control of the control unit 310. The image input unit 305 includes an image sensor for acquiring one or more images within its recognizable range and is normally aimed forward from multimedia apparatus 200 (i.e., towards any user of the multimedia apparatus), or may include a depth sensor for acquiring depth information about a user located in front of it. Control unit 310 may function as the image processor for recognizing the user using a recognition algorithm on one or more images received from image input unit 305. However, as is well-known to one of ordinary skill in the art, an image processor may be provided separately from the control unit 310. If no user is detected in the received image(s), the control unit 310 acquires sensor information about the controller's movements through the short-range communication unit 315 from the controller 215. Control unit 310 subsequently estimates the location of the controller 215 based on the sensor information, and controls the display unit 320 to output guidance information so that the user will move the controller 215 within the recognizable range of the multimedia apparatus 200.

Control unit 310 outputs the guidance information through at least one of a screen, a speaker, and a vibration device. When the user possessing the controller 215 moves toward the multimedia apparatus 200, the controller 215 transmits its coordinate values (that is, sensor information) changed according to the user's movement to the multimedia apparatus 200 through the short-range communication unit 315.

In the embodiment shown in FIG. 4A, the controller 215 includes a short-range communication unit 325, a control unit (for example, an application processor, a CPU, or the like) 330, a sensor unit 335, and an input/output module 345.

The short-range communication unit 325 is configured to communicate with the multimedia apparatus 200 by a short-range communication method.

The sensor unit 335 is a sensor for sensing the location, direction, orientation, position, and/or movement of the controller 215, and may include one or more of an acceleration sensor, a gyro sensor, a gravity sensor, a shock sensor, a GPS, and a compass sensor. The sensor unit 335 is configured to acquire sensor information, including, e.g., coordinate values changed according to the user's movements.

The control unit 330 transmits the sensor information acquired by the sensor unit 335 to the multimedia apparatus 200 through the short-range communication unit 325, in response to a request from the multimedia apparatus 200. The request may be transmitted from the multimedia apparatus 200 to the controller 215 when the multimedia apparatus 200 has determined that no user exists in the recognizable range.

According to another embodiment of the present invention, guidance information indicating a direction in which the target has to move is output on the screen of the controller 215, instead of the screen of multimedia apparatus 200. In such a case, the controller 215 receives direction information from the multimedia apparatus 200, and outputs guidance information indicating a direction in which the target has to move to return within recognizable range.

In the embodiment shown in FIG. 4A, controller 215 includes a display unit 340. The display unit 340 may be implemented in the form of a LCD panel, and may also be implemented as a touch screen, in which case the display unit 340 also operates as an input unit. The display unit 340 is used to display information input by a user or information to be provided to a user, in addition to various menus of the controller 215. Display unit 340 provides the user with various UIs corresponding to various services (for example, applications, games, etc.).

Input/output module 345 includes any of a button, a microphone, a speaker, a vibration device, a connector, and a keypad.

According to still another embodiment of the present invention, the controller generates and outputs the direction information to the user. More specifically, control unit 330 of the controller 215 uses sensor information to calculate the tilting angle of the reference axis of the controller 215 with respect to the reference axis of the multimedia apparatus 200, generates information about a direction in which the controller 215 has to rotate (determined based on the calculated tilting angle), and then outputs the direction guidance information to the user. In this embodiment, the direction information is calculated by the controller 215, instead of the multimedia apparatus 200. Here, the reference axis of the multimedia apparatus 200 may be requested from the multimedia apparatus 200 and provided to the controller 215.

Figure 4B:
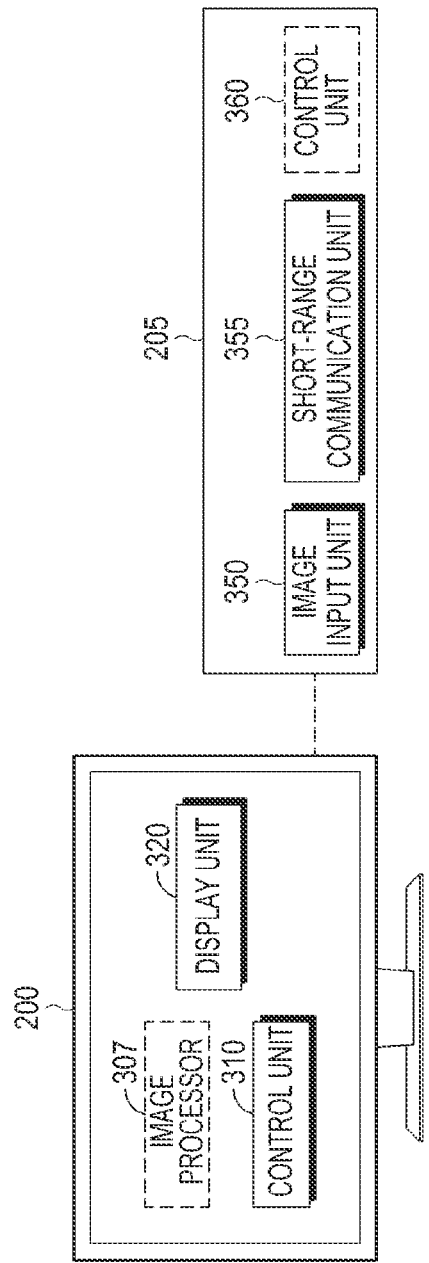
FIG. 4B is a block diagram of the multimedia apparatus and a separate target tracking unit according to an embodiment of the present invention.

FIG. 4A illustrates an example in which the target tracking components are included in the multimedia apparatus 200, however, as illustrated in FIG. 4B, those components may be included in a separate target tracking unit 205. It is also possible that the target tracking unit can be installed or implemented in other types of external devices. For example, the target tracking unit may be a set-top box, etc., which is connected to the multimedia apparatus 200 either by wire or wirelessly.

Referring to FIG. 4B, the target tracking unit 205 includes an image input unit 350, a short-range communication unit 355, and a control unit 360. In other embodiments, the target tracking unit 205 may include only the image input unit 350 and the short-range communication unit 355.

The components of the target tracking unit 205 operate in the same manner as the corresponding components of the multimedia apparatus 200. Briefly, the image input unit 350 is configured to obtain an image of a forward view. If no target is detected from the received image(s), the control unit 360 of the target tracking unit 205 acquires sensor information for location estimation from the controller 215 through the short-range communication unit 355. The control unit 360 creates guidance information based on the location estimated using the sensor information, and transmits the guidance information to the controller 215 through the short-range communication unit 355 so that the user can move the controller 215 to within the recognizable range of the target tracking unit 205. The recognizable range of the target tracking unit 205 depends on the imaging range of the image input unit 350.

In embodiments where the target tracking unit 205 includes only the image input unit 350 and the short-range communication unit 355, the image input unit 350 and the short-range communication unit 355 operate in the same manner although the control unit 360 is omitted.

Figure 5:
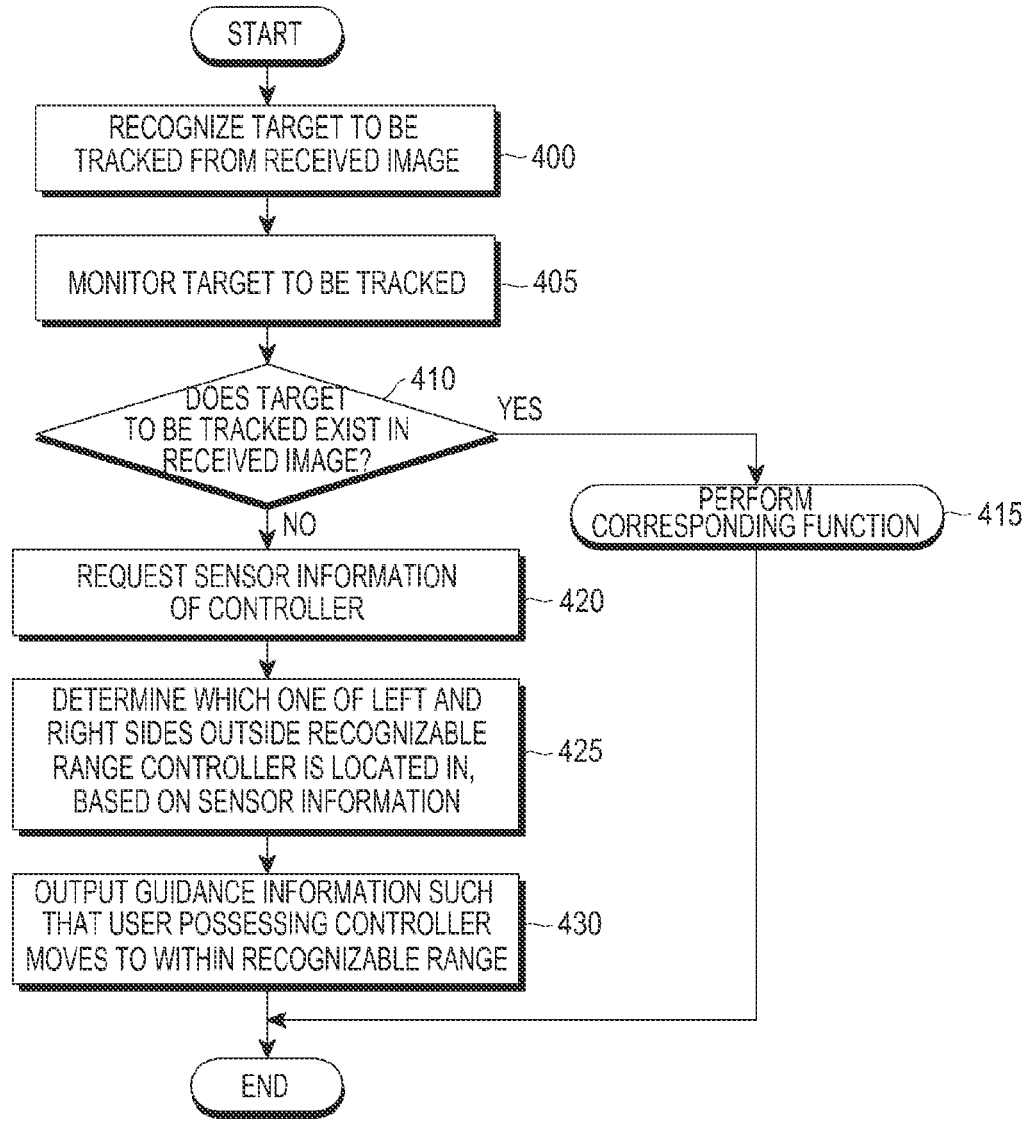
FIG. 5 is a flowchart of a method of operation of the multimedia apparatus, according to an embodiment of the present invention.

FIG. 5 is a flowchart of a method of operation of the multimedia apparatus 200, according to an embodiment of the present invention.

Referring to FIGS. 2 and 5, when imaging starts, the multimedia apparatus 200 recognizes a target to be tracked from one or more images received through a camera in step 400, and then monitors or tracks the target in step 405. As is well-known to one of ordinary skill in the art, there are various methods for recognizing and tracking a target, including using a general recognition algorithm to extract feature points from an input image and then performing template matching. Multimedia apparatus 200 determines whether the target has been recognized in the received image(s) in step 410. If it is determined that the target has been detected, the multimedia apparatus 200 performs function(s) that correspond to the user's movement(s) as an input command(s) in step 415.

Figure 6:
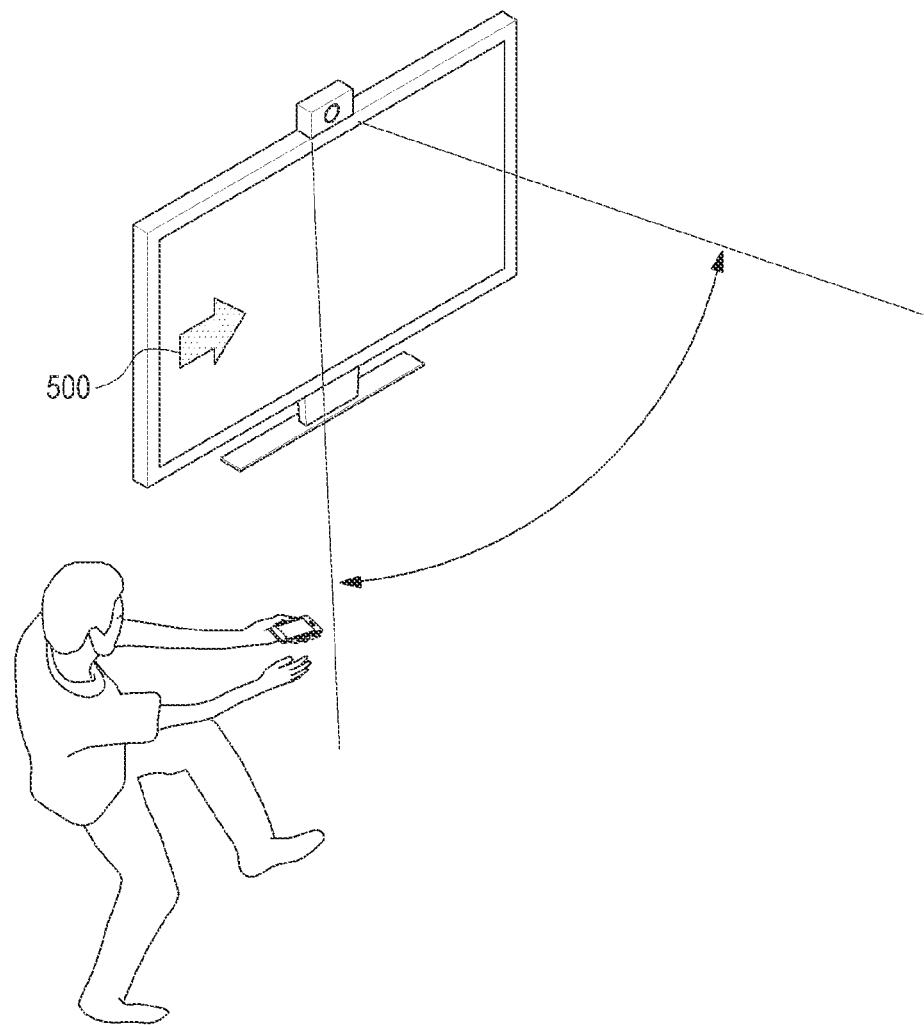
FIG. 6 illustrates an embodiment of the present invention which provides guidance for a user to move back within the recognizable range of the multimedia apparatus.

If it is determined in step 410 that no target has been detected, the multimedia apparatus 200 requests the controller 215 to send sensor information in step 420, and then determines in step 425 where outside the recognizable range the controller 215 is located (i.e., to the left or right of the recognizable range), based on sensor information provided by the controller 215. In an embodiment of the present invention, the user is asked to make a movement or gesture with the controller, and, in such a case, the sensor information includes coordinates and/or information about the movement, orientation, and/or direction of the controller 215 before, after, and/or during the performance of the gesture/ movement by the user. In step 430, the multimedia apparatus 200 outputs guidance information so that the user possessing the controller 215 moves within the recognizable range. For example, the guidance information could be a directional icon, symbol, or character, such as the arrow 500 illustrated in FIG. 6 on the screen of the multimedia apparatus 200.

In the embodiments described above, the user is requested to perform an action in order to determine the location of the controller 215. According to other embodiments, such as the example discussed below, the location of the controller 215 is determined without requiring a movement or gesture from the user, by using acceleration sensor information from the time at which the recognition target moved out of the recognizable range.

Figure 7:
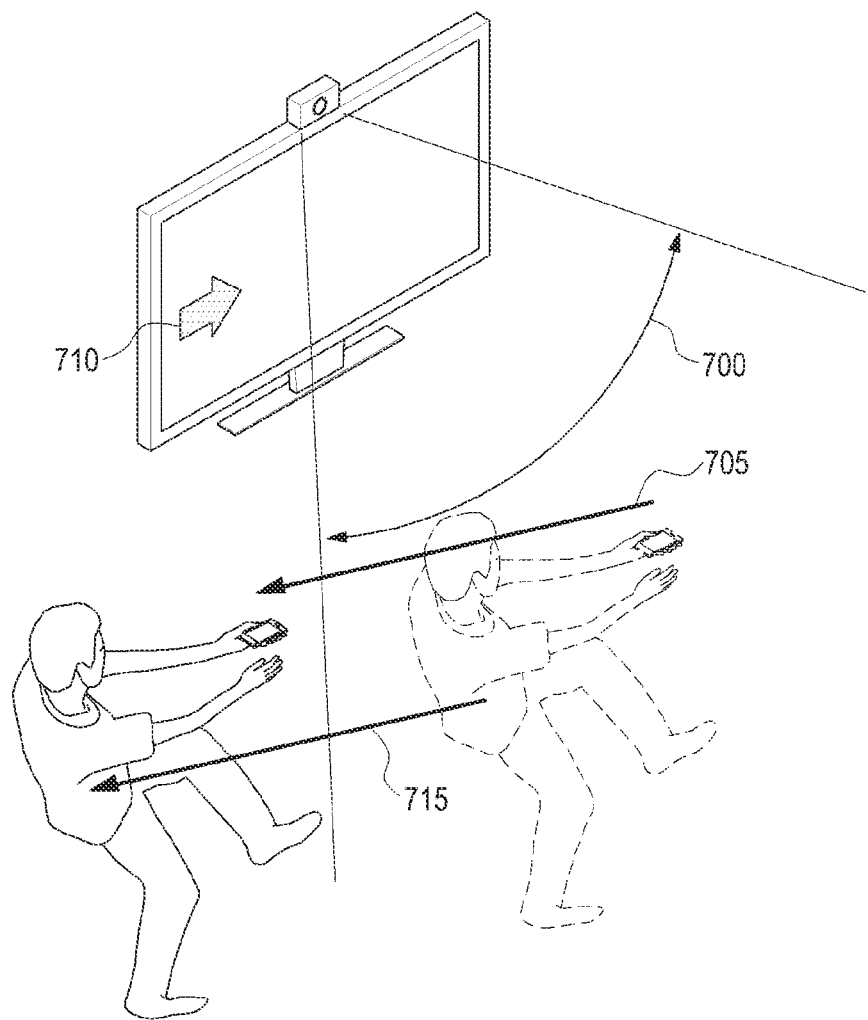
FIG. 7 illustrates another embodiment of the present invention which provides guidance for a user to move within the recognizable range of the multimedia apparatus.

In FIG. 7, the user has moved out of recognizable range 700 in the left direction 715. When the multimedia apparatus 200 determines that the user has moved from the recognizable range 700, the multimedia apparatus 200 analyzes sensor information (that is, acceleration information) received from the controller 215 during a predetermined time period before and after the moment when the user moved out of recognizable range 700. Acceleration information may be regularly received by the multimedia apparatus 200, whether periodically or intermittently, from the controller 215. Alternatively, the multimedia apparatus 200 may request certain acceleration sensor information from the controller 215 when the target is no longer detected in the recognizable range. The certain acceleration sensor information may be acceleration sensor measurements collected by controller 215 over a predetermined time period. Controller 215 may automatically measure acceleration sensor information for predetermined periods of time, and then store the measured acceleration sensor information in a temporary buffer.

In the example of FIG. 7, if the left region outside the recognizable range is set to "+", the acceleration value when the controller 215 moves out of the recognizable range into the left region is "+" since the direction of velocity is "left". Multimedia apparatus 200 determines that the movement direction of the controller 215 is in acceleration direction 705 based on the acceleration sensor information. Since the acceleration direction 705 of the controller 215 is identical to the acceleration direction 715 of the user, the multimedia apparatus 200 determines that the user has moved to the left side of the recognizable range 700. In such a manner, since acceleration sensor information has a direction and a magnitude, the multimedia apparatus 200 can determine the movement direction of a user possessing the controller 215 based on the acceleration sensor information. After determining the acceleration direction, the multimedia apparatus 200 outputs guidance information 710 indicating the direction opposite to the acceleration direction, thereby guiding the user to move back within the recognizable range 700.

Figure 8:
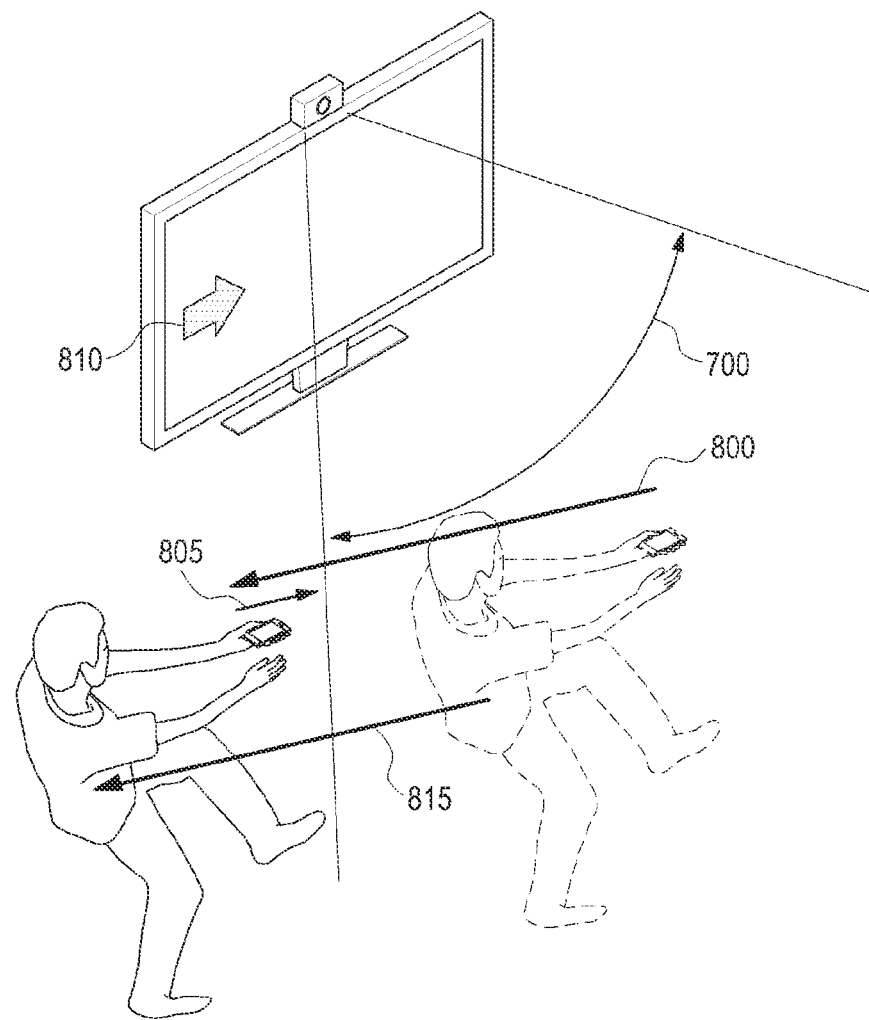
FIG. 8 illustrates another embodiment of the present invention which provides guidance for a user to move within the recognizable range of the multimedia apparatus.

FIG. 8 illustrates an embodiment of the present invention which compensates for the directions indicated by the acceleration sensor readings when the user moves the controller in and out of the recognizable range at the boundary of the recognizable range.

Referring to FIG. 8, if a user moves the controller 215 in the right direction 805 back within the recognizable range 700 at roughly the same moment when he/she moves out of the recognizable range 700 in the left direction 815, the movement direction of the controller 215 at the moment the user exits the recognizable range is opposite to the movement direction 815 of the user. However, the time period in which the movement direction 805 of the controller 215 is opposite to the movement direction 815 of the user is very short, while the time period in which the movement direction 800 of the controller 215 was in the same movement direction 815 as the user, i.e., towards the left outside of the recognizable range 700, was much longer.

Accordingly, the acceleration direction of the controller 215 is analyzed for a longer period when the user moves out of the recognizable range 700, that is, for a predetermined time period (for example, for 0.5 to 1 second) from the time in which it was determined that the user was no longer in the recognizable range 700. If the left region outside the recognizable range 700 is set to "+", the direction 800 of initial acceleration is "+" and the direction 805 of later acceleration is "−". However, since it corresponds to a very short period, the direction 805 of later acceleration is effectively ignored when the period of analysis includes the much longer period of initial acceleration in direction 800. Accordingly, the multimedia apparatus 200 finally determines that the direction 800 of initial acceleration is the direction in which the user has moved, and outputs guidance information 810 corresponding to the direction opposite to the user's movement direction. Thereby, the multimedia apparatus 200 can guide the user to move within the recognizable range 700 in real time.

According to the embodiments of the present invention as described above, if a subject is located out of the recognizable range of a multimedia apparatus when a camera mounted on the multimedia apparatus is initially driven, or if the subject moves out of the recognizable range while the camera is operating, the multimedia apparatus determines the relative location of the subject and guides the subject back within the recognizable range.

Embodiments of the present invention may be implemented in the form of hardware, software, or a combination of hardware and software. The software may be stored in a volatile or non-volatile memory device such as, for example, a Read-Only Memory (ROM), regardless of whether it is erasable or re-writable, in a memory such as, for example, a Random Access Memory (RAM), a memory chip, and an Integrated Circuit (IC), or in an optically/magnetically recordable and machine-readable storage medium including non-transitory computer-readable mediums such as, for example, a Compact Disk (CD), a Digital Versatile Disk (DVD), a magnetic disk, and a magnetic tape. Any memory that can be included in a multimedia apparatus and/or a controller and that constitutes a machine-readable storage medium suitable to store one or more programs, including instructions implementing embodiments of the present invention, is suitable for embodiments of the present invention. Therefore, embodiments of the present invention include programs that have instructions for implementing the methods as set forth in the appended claims, and any machine-readable storage medium storing those programs. Programs according to embodiments of the present invention may be electronically transferred through any media and equivalents thereof, such as communication signals, which are transferred through wired or wireless connections.

Thus, the multimedia apparatus and/or the controller may receive a program according to embodiments of the present invention from a program providing apparatus connected thereto in a wired or wireless manner, and store the program therein. According to embodiments of the present invention, the program providing apparatus may be: a memory configured to store a program including instructions for instructing the multimedia apparatus and/or the controller to perform a method of outputting pre-set guidance information, information required for the method of outputting the guidance information, etc.; a communication unit configured to perform wired or wireless communication with the multimedia apparatus and/or the controller; and a control unit configured to transmit the corresponding program to the multimedia apparatus and/or the controller automatically or according to a request from the multimedia apparatus and/or the controller.

While the invention has been shown and described with reference to certain embodiments thereof, it will be understood by those of ordinary skill in the art that various changes in form and details may be made therein without departing from the spirit and scope of the invention as defined by the appended claims and their equivalents.

What is claimed is:

1. A method for guiding a user of a controller of a multimedia apparatus to move within an angle-of-view range of a camera connected to the multimedia apparatus, comprising:
    determining, using the camera, whether a target is within the angle-of-view range of the camera; and
    if it is determined that the target is not within the angle-of-view range:
        acquiring sensor information generated by a sensor included in the controller, the sensing information indicating movements of the controller corresponding to the target;
        estimating the location of the controller corresponding to the target based on the sensor information; and
        outputting, by the multimedia apparatus, guidance information based on the estimated location of the controller to guide the target to move within the angle-of-view range of the camera,
    wherein the sensor information is generated outside the angle-of-view range of the camera,
    wherein the multimedia apparatus is configured to determine a movement of the target within the angle-of-view range of the camera as an input of the multimedia apparatus using the camera.

2. The method of claim 1, wherein, if it is determined that the target is not within the angle-of-view range, further comprising:
    outputting instruction information instructing the target to perform a gesture with the controller.

3. The method of claim 1, wherein determining whether the target is in the angle-of-view range of the camera comprises:
    receiving an image through the camera;
    recognizing the target from the received image; and
    tracking the target.

4. The method of claim 1, further comprising, if no target is detected in the angle-of-view range of the camera, outputting guidance information for guiding the target to move toward the multimedia apparatus.

5. The method of claim 1, wherein the sensor information acquired from the controller comprises sensor information of changes in the controller's position, orientation, and/or direction when the target makes a predetermined gesture in response to instruction information.

6. The method of claim 1, further comprising:
    calculating an angle that a reference axis of the controller tilts with respect to a predetermined reference axis of the multimedia apparatus, based on the sensor information of the controller;
    generating direction information to be displayed on a screen of the controller, based on the calculated tilting angle; and
    transmitting the direction information to the controller.

7. The method of claim 1, wherein estimating the location of the controller comprises determining whether the controller is located to the right or left of the angle-of-view range of the camera, based on the sensor information of the controller.

8. The method of claim 7, wherein outputting guidance information corresponding to the estimated location of the controller comprises outputting information for guiding the target to move in a direction opposite to the direction in which the controller is outside of the angle-of-view range.

9. The method of claim 1, wherein outputting guidance information corresponding to the estimated location of the controller comprises outputting guidance information through at least one of a display unit, a speaker, and a vibration device of the multimedia apparatus.

10. The method of claim 1, wherein the sensor information is acquired from at least one of an acceleration sensor and a gyro sensor in the controller.

11. A multimedia apparatus for guiding a user of a controller of the multimedia apparatus to move within an angle-of-view range of a camera connected to the multimedia apparatus, comprising:
    a display; and
    a processor configured to:
        determine, using the camera, whether a target is within the angle-of-view range of the camera,
        acquire sensor information generated by a sensor included in the controller, the sensing information indicating movements of the controller corresponding to the target when no target is detected within the angle-of-view range of the camera,
        estimate the location of the controller corresponding to the target using the sensor information of the controller, and
        output, using the display, guidance information based on the estimated location of the controller to guide the target to move within the angle-of-view range of the camera,
    wherein the sensor information is generated outside the angle-of-view range of the camera,
    wherein the processor is further configured to determine a movement of the target within the angle-of-view range of the camera as an input of the multimedia apparatus using the camera.

12. The multimedia apparatus of claim 11, further comprising:
    one or more output units configured to output instruction information when no target is detected within the angle-of-view range, the instruction information comprising instructions for the target to perform a predetermined gesture.

13. The multimedia apparatus of claim 11, further comprising:
    an image input unit configured to receive one or more images acquired by the camera; and
    a short-range communication unit configured to communicate with the controller, to receive sensor information from the controller, and to relay the sensor information from the controller to the control unit.

14. The multimedia apparatus of claim 13, wherein the image input unit and the short-range communication unit are installed in a set-top box connected to the multimedia apparatus in at least one of a wired and wireless manner.

15. The multimedia apparatus of claim 13, wherein if no target is detected within the angle-of-view range, the control unit outputs guidance information for guiding the user to move toward the multimedia apparatus, the guidance information being output through at least one of the display unit, a speaker, and a vibration device.

16. The multimedia apparatus of claim 11, wherein the sensor information from the controller comprises information indicating a change in at least one of position, orientation, and direction of the controller when the target makes a predetermined gesture in response to the guidance information.

17. The multimedia apparatus of claim 16, wherein the sensor information includes coordinates of the controller before the user makes the predetermined gesture, and the coordinates of the controller after the target makes the predetermined gesture.

18. The multimedia apparatus of claim 11, wherein the control unit calculates an angle at which the controller is tilting with respect to a predetermined reference axis of the multimedia apparatus, based on the sensor information, and estimates the relative location of the controller using the tilting angle of the controller.

19. The multimedia apparatus of claim 18, wherein the control unit determines whether the controller is located to the left or right side outside the angle-of-view range of the camera, based on the tilting angle of the controller.

20. The multimedia apparatus of claim 19, wherein the control unit outputs information for guiding the target to move in a direction opposite to the left or right side outside the angle-of-view range of the camera the controller is located in, and wherein the information is output through at least one of the display unit, a speaker, and a vibration device.

21. The multimedia apparatus of claim 11, wherein the controller comprises:
- a sensor configured to acquire sensor information indicating a change in position, orientation, and/or direction of the controller;
- a short-range communication unit configured to communicate with the multimedia apparatus; and
- a control unit configured to calculate an angle at which a reference axis of the controller tilts with respect to a predetermined reference axis of the multimedia apparatus, based on the sensor information, to generate information about a direction in which the controller is to rotate in consideration of the calculated tilting angle, and to output the information about the direction for rotation.

22. A portable electronic device, comprising:
- a short-range communication unit configured to transmit short-range communication signals;
- at least one sensor configured to acquire information concerning at least one of orientation, movement, and location of the portable electronic device; and
- at least one non-transitory computer-readable medium having program instructions recorded thereon, the program instructions configured to have the portable electronic device perform the steps of:
  - receiving, via the short-range communication unit, a request from a multimedia system for sensor information corresponding to a user of the portable electronic device when the user of the portable electronic device is outside an angle-of-view range of the multimedia system; and
  - transmitting, via the short-range communication unit, the requested sensor information to the multimedia system, the multimedia system subsequently using the received sensor information to determine which direction outside its angle-of-view visual range the user is in,
- wherein the sensor information is generated outside the angle-of-view range of the multimedia system,
- wherein a movement of the user is determined as an input of the multimedia system within the angle-of-view range of the multimedia system.

23. The portable electronic device of claim 22, wherein the program instructions recorded on the at least one non-transitory computer-readable medium are further configured to have the portable electronic device perform the step of:
- acquiring, via the at least one sensor, information concerning change in orientation of the portable electronic device after the multimedia system instructs the user of the portable electronic device to perform an action with the portable electronic device.

* * * * *